United States Patent
Li

(10) Patent No.: US 11,952,561 B2
(45) Date of Patent: Apr. 9, 2024

(54) BLACK MALT AND METHOD FOR FORMING BLACK MALT

(71) Applicant: Yin Li, New Berlin, WI (US)

(72) Inventor: Yin Li, New Berlin, WI (US)

(73) Assignee: MALTEUROP NORTH AMERICA, INC., Milwaukee, WI (US)

( * ) Notice: Subject to any disclaimer, the term of this patent is extended or adjusted under 35 U.S.C. 154(b) by 183 days.

(21) Appl. No.: 16/953,647

(22) Filed: Nov. 20, 2020

(65) Prior Publication Data
US 2021/0155884 A1    May 27, 2021

Related U.S. Application Data

(60) Provisional application No. 62/939,427, filed on Nov. 22, 2019.

(51) Int. Cl.
| | | |
|---|---|---|
| *C12C 1/18* | (2006.01) | |
| *A23L 7/20* | (2016.01) | |
| *C12C 1/02* | (2006.01) | |
| *C12C 1/10* | (2006.01) | |

(52) U.S. Cl.
CPC .............. *C12C 1/18* (2013.01); *A23L 7/20* (2016.08); *C12C 1/02* (2013.01); *C12C 1/10* (2013.01)

(58) Field of Classification Search
CPC .................................. C12C 1/067; C12C 1/18
See application file for complete search history.

(56) References Cited

U.S. PATENT DOCUMENTS

| | | | |
|---|---|---|---|
| 4,496,605 A * | 1/1985 | Targan | .............. C12C 5/04 426/655 |
| 5,405,624 A | 4/1995 | Doncheck et al. | |
| 5,637,336 A | 6/1997 | Kannenberg et al. | |
| 6,449,872 B1 | 9/2002 | Olkku et al. | |
| 2005/0142261 A1 | 6/2005 | Cheong | |

FOREIGN PATENT DOCUMENTS

| | | |
|---|---|---|
| DE | 3007143 A1 | 9/1981 |
| DE | 4428978 A1 | 3/1995 |
| EP | 1772513 A1 | 4/2007 |
| WO | WO 2008/156051 A1 | 12/2008 |

OTHER PUBLICATIONS

Hertrich, J.D., "Topics in Brewing: Malting", MBAA TQ, vol. 50, No. 4, (2013), pp. 131-141. (Year: 2013).*
Akkarachaneeyakorn, S. et al., "Optimization of combined microwave-hot air roasting of malt based on energy consumption and neo-formed contaminants content." Journal of Food Science, 2010, vol. 75, No. 4, pp. E201-E207.

* cited by examiner

*Primary Examiner* — Elizabeth Gwartney
(74) *Attorney, Agent, or Firm* — Reinhart Boerner Van Deuren P.C.

(57) ABSTRACT

A process of producing black malt. In the process, a batch of malted grain is steeped in water such that, after steeping, the malted grain has a first moisture content. The batch of malted grain is microwaved such that, after microwaving, the first moisture content is reduced to a second moisture content. Further, in the process, the batch of malted grain is dried at a temperature of from 150° C. to 200° C. for a time period sufficient to produce the batch of black malt. The batch of black malt has a third moisture content that less than the second moisture content.

12 Claims, 2 Drawing Sheets

BLACK MALT AND METHOD FOR FORMING BLACK MALT

CROSS-REFERENCE TO THE RELATED PATENT APPLICATIONS

This patent application claims the benefit of U.S. Provisional Patent Application No. 62/939,427 filed on Nov. 22, 2019, the entire teachings and disclosure of which are incorporated herein by reference thereto.

FIELD OF THE INVENTION

This invention generally relates to black malt and a method of producing same.

BACKGROUND OF THE INVENTION

During the process of brewing, a variety of malted grains are utilized as fermentable material, for flavoring, or for coloring of the brew. One variety of malt utilized in brewing to add color, flavor, and aroma is referred to as "black malt" because the malt is kilned at high temperatures, causing the color of the malt to darken. Black malt has no enzymatic activity and is not involved in fermenting. In a conventional process of producing black malt, a finished base malt is utilized as the starting material, instead of a green (i.e., germinated) malt. The starting malt has a moisture content of around 5%, and the malt is rewetted, e.g., in a roasting drum. Thereafter, the malt is kiln-dried at temperatures over 200° C., in particular at a temperature in the range of about 220° C. to about 240° C. However, these high temperatures are costly to maintain and produce large amounts of emissions.

BRIEF SUMMARY OF THE INVENTION

In view of such limitations, Applicant has recognized a need in the art for a new method of producing black malts that is less costly, at least in terms of energy input. These and other advantages of the invention, as well as additional inventive features, will be apparent from the description of the invention provided herein.

According to a first aspect, embodiments of the present disclosure relate to a process of producing black malt. In the process, a batch of malted grain is steeped in water such that, after steeping, the malted grain has a first moisture content. The batch of malted grain is microwaved such that, after microwaving, the first moisture content is reduced to a second moisture content. Further, in the process, the batch of malted grain is dried at a temperature of from 150° C. to 200° C. for a time period sufficient to produce the batch of black malt. The batch of black malt has a third moisture content that less than the second moisture content.

In embodiments of the process, the first moisture content is from 40% to 50% by weight and the second moisture content is from 20% to 38% by weight, in particular 25% to 35% by weight.

In embodiments of the process, the third moisture content is from 0.5% to 4.5% by weight.

In embodiments of the process, the step of drying is performed in a kiln.

In embodiments of the process, the step of drying is performed at a temperature of 175° C. to 195° C.

In embodiments of the process, the time period of drying is from 2 hours to 5 hours.

In embodiments of the process, the step of microwaving is performed for a time of 2 minutes to 20 minutes.

In embodiments of the process, the step of microwaving comprises exposing the batch of malted grain to microwave radiation having a frequency of 915 MHz to 2450 MHz.

In embodiments of the process, the batch of black malt as a color of 375° L to 620° L.

In embodiments of the process, the batch of malted gain comprises kernels of at least one of barley, wheat, corn, rice, rye, or oat.

In embodiments of the process, the batch of black malt has a crystallization rate of 0%.

According to a second aspect, embodiments of a batch of black malt are also disclosed herein. The batch of black malt is produced according to the process as described in any one of the foregoing paragraphs of this section.

In embodiments of the batch of black malt, the batch of black malt has a crystallization rate of 0%.

In embodiments, the batch of black malt has a moisture content of 0.5% to 4.5% by weight.

In such embodiments, a plurality of kernels of the batch of black malt have an internal structure of amorphous sugar.

In embodiments of the batch of black malt, the batch of black malt has a color of 375° L to 620° L.

According to a third aspect, embodiments of a black malt are further disclosed herein. The black malt includes a kernel of barley, wheat, corn, rice, rye, or oat. An internal structure of the kernel comprises amorphous sugar, and the kernel comprises a color of 375° L to 620° L.

In embodiments of the black malt, the kernel is uncrystallized.

In embodiments of the black malt, the black malt has a moisture content of 0.5% to 4.5% by weight Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring generally to the figures, embodiments of a black malt and a method of producing same are disclosed herein. The embodiments discussed and depicted herein are presented by way of illustration and not by way of limitation.

Figure 1:
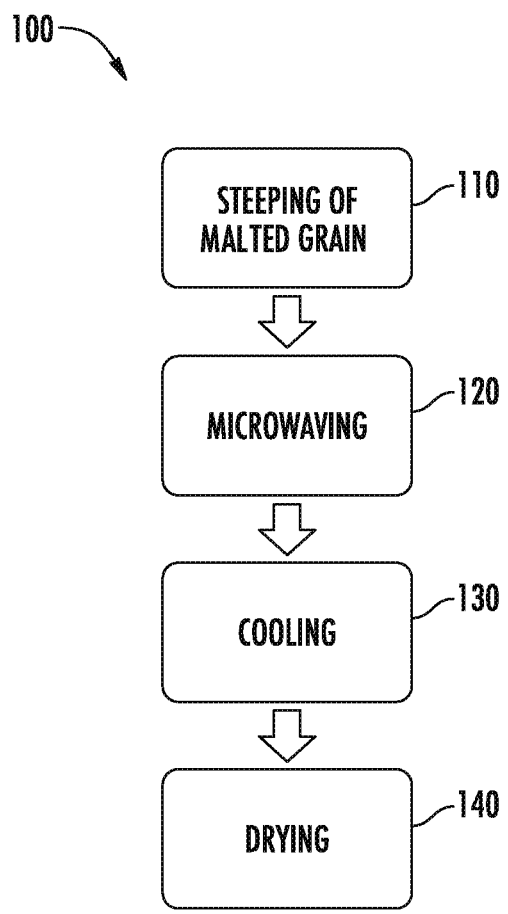
FIG. 1 is a flow diagram of a method of producing black malt, according to an exemplary embodiment.

FIG. 1 provides a flow diagram of a process 100 for producing black malt according to an exemplary embodiment. The process 100 begins by steeping or wetting 110 a base malt that has already undergone a malting process (generally, involving steeping a batch of grains, germinating the grains, drying the grains, and any cleaning operations to remove sprouts and roots). The grain may be any of a variety of malted grains, such as barley and wheat, in particular, but also corn, rice, rye, or oat, among others. During the step of steeping 110, the grain is soaked in water for 10 hours to 20 hours. In embodiments, the moisture content of the malt after steeping is between 40% and 50% by weight, more particularly between 42% and 48% by weight.

According to the presently disclosed method, the wet malt undergoes a step of microwaving 120 after steeping 110 to accelerate grain saccharification and Maillard reactions. Additionally, during microwaving, the moisture content of the malt is reduced. In embodiments, the moisture content of the malt is reduced from 40%-50% by weight to 20%-38% by weight, more particularly to 25%-35% by weight.

Figure 2:
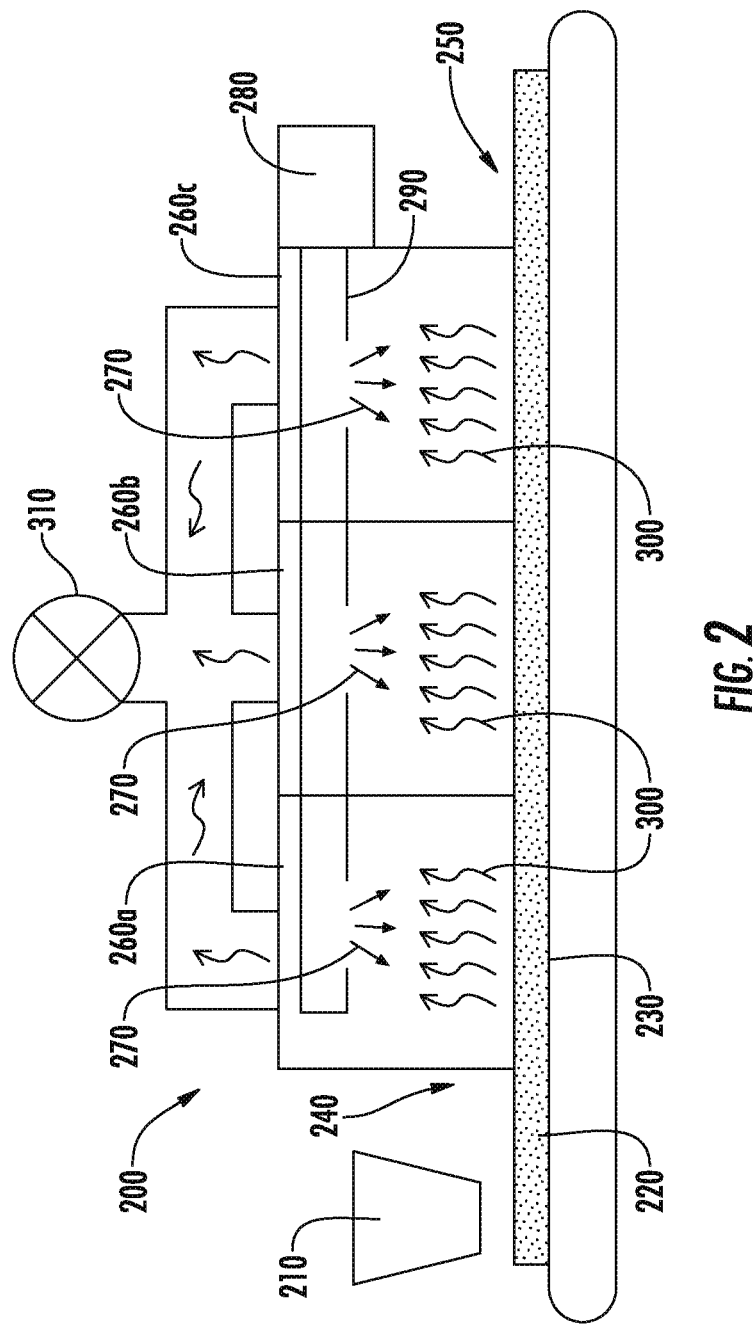
FIG. 2 is a schematic depiction of a microwave tunnel usable in the black malt process disclosed herein, according to an exemplary embodiment.

In embodiments, microwaving 120 is performed in a microwave tunnel as shown in FIG. 2. The microwave tunnel 200 has a hopper 210 through which the steeped malt 220 is loaded onto a conveyor belt 230. The conveyor belt 230 transports the steeped malt 220 along the length of the microwave tunnel 200 from a first end 240 to a second end 250 and through a plurality of microwave zones 260a, 260b, 260c. In embodiments, the microwave tunnel 200 has a length of from about 10 m to about 15 m, and the width of the microwave tunnel 200 is from about 0.5 m to about 1 m. In the microwave zones 260a, 260b, 260c, the steeped malt is exposed to microwave radiation 270 that is produced by a magnetron 280 and that is carried to each zone 260a, 260b, 260c by a waveguide 290. While three microwave zones 260a, 260b, 260c are depicted in FIG. 2, the microwave tunnel 200 may contain fewer or a greater number of microwave zones and may have different dimensions.

The microwave radiation 270 has a frequency of 915 MHz to 2450 MHz. In the microwave tunnel 200, the microwave frequency is set by the magnetron 280. In preferred embodiments, the magnetron 280 produces microwaves having a frequency of 915 MHz. Further, in embodiments, the magnetron 280 has a power of up to 75 kW. In embodiments, the steeped malt is exposed to the microwave radiation 270 for a time of 2 minutes to 20 minutes, more preferably for a time of 3 minutes to 6 minutes. During microwaving 120, the steeped malt is raised to a temperature of 65° C. to 68° C. Further, as shown schematically in FIG. 2, the microwave radiation 270 causes moisture 300 to evaporate from the steeped malt 220. Thus, in embodiments, the microwave tunnel 200 may be provided with a dehumidifier system 310 to remove the moisture form the zones 260a, 260b, 260c.

Referring back to FIG. 1, in embodiments, the microwaved malt undergoes a step of cooling 130 after microwaving 120. In embodiments, the microwaved malt is cooled to a temperature of 40° C. to 50° C. In embodiments, the microwaved malt can be cooled by leaving the microwaved malt in ambient conditions. In other embodiments, the microwaved malt can be cooled using forced air or refrigeration to speed the cooling process.

The microwaved malt undergoes drying 140 after microwaving 120 and cooling 130 to further reduce the moisture content of the malt and to darken the color of the malt, which also brings out desired flavors and aromas. In embodiments, the color of the black malt is from about 375 to about 620° L (Lovibond scale). During drying 140, the moisture content of the microwaved malt is reduced to about 0.5%-4.5% by weight, more particularly to 1.0%-3.0% by weight. In general, the moisture content of the black malt is lower than other malt varieties, such as crystal malts, which typically have a moisture content of up to about 6%. In embodiments, drying 140 takes place at a temperature below 200° C., particularly in the range of from 150° C. to 200° C., and more particularly in the range of from 175° C. to 195° C., for a time of 2 hours to 5 hours, more particularly 2 hours to 4 hours. In embodiments, the step of drying 140 may be performed in a kiln. During drying, the temperature is high enough to destroy the crystallization of the sugars produced during saccharification in the microwave (e.g., a crystallization rate of 0%). Besides color, the black malts described herein are also distinguishable from crystal malts because of the lack of an internal crystal structure (crystal malts having a crystallization rate of 40%-60%). In embodiments, the internal structure may be described as an amorphous sugar in which some of the sugars are combined with amino acids, forming Maillard reaction compounds.

As compared to conventional methods of producing black malt, the drying step 140 is performed at lower temperatures, which leads to a more economical process. The black malts produced by the method disclosed herein are usable in a variety of applications, in particular in brewing, e.g., to adjust the color of the beer brewed using the black malt.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A process of producing a batch of black malt, comprising the steps of:

steeping a batch of malted grain in water such that, after steeping, the malted grain has a first moisture content;

microwaving the batch of malted grain such that, after microwaving, the first moisture content is reduced to a second moisture content; and drying the batch of malted grain at a temperature of from 150° C. to 200° C. for a time period sufficient to produce the batch of black malt, wherein the batch of black malt has a third moisture content less than the second moisture content.

2. The process of claim 1, wherein the first moisture content is from 40% to 50% by weight and the second moisture content is from 20% to 38% by weight.

3. The process of claim 2, wherein the second moisture content is from 25% to 35% by weight.

4. The process of claim 2, wherein the third moisture content is from 0.5% to 4.5% by weight.

5. The process of claim 1, wherein the step of drying is performed in a kiln.

6. The process of claim 1, wherein the step of drying is performed at a temperature of 175° C. to 195° C.

7. The process of claim 6, wherein the time period of drying is from 2 hours to 5 hours.

8. The process of claim 1, wherein the step of microwaving is performed for a time of 2 minutes to 20 minutes.

9. The process of claim 1, wherein the step of microwaving comprises exposing the batch of malted grain to microwave radiation having a frequency of 915 MHz to 2450 MHz.

10. The process of claim 1, wherein the batch of black malt has a color of 375° L to 620° L.

11. The process of claim 1, wherein the batch of malted grain comprises kernels of at least one of barley, wheat, corn, rice, rye, or oat.

12. The process of claim 1, wherein the batch of black malt is composed only of kernels having internal structures that are not crystallized.

* * * * *